United States Patent [19]
Rich

[11] Patent Number: 5,933,131
[45] Date of Patent: Aug. 3, 1999

[54] LUMINANCE CONTROLLED COLOR RESOLUTION REDUCTION

[75] Inventor: Henry H. Rich, Raleigh, N.C.

[73] Assignee: Integrated Device Technology, Inc., Santa Clara, Calif.

[21] Appl. No.: 09/048,195

[22] Filed: Mar. 25, 1998

Related U.S. Application Data

[62] Division of application No. 08/790,150, Jan. 28, 1997, Pat. No. 5,796,385.

[51] Int. Cl.⁶ .................................................... G09G 5/04
[52] U.S. Cl. ........................... 345/155; 345/153; 345/132
[58] Field of Search ................... 345/155, 153, 345/132, 3

[56] References Cited

U.S. PATENT DOCUMENTS

| | | | |
|---|---|---|---|
| 4,586,038 | 4/1986 | Sims et al. | 340/729 |
| 4,590,465 | 5/1986 | Fuchs | 340/723 |
| 4,692,880 | 9/1987 | Merz et al. | 364/521 |
| 4,727,365 | 2/1988 | Bunker et al. | 340/728 |
| 4,783,649 | 11/1988 | Fuchs et al. | 340/747 |
| 4,827,445 | 5/1989 | Fuchs | 364/900 |
| 4,905,164 | 2/1990 | Chandler et al. | 364/518 |
| 4,965,745 | 10/1990 | Economy et al. | 364/518 |
| 5,341,464 | 8/1994 | Friedman et al. | 345/155 |
| 5,388,206 | 2/1995 | Poulton et al. | 395/163 |
| 5,396,346 | 3/1995 | Nakayama et al. | 358/448 |
| 5,455,600 | 10/1995 | Friedman et al. | 345/153 |
| 5,469,190 | 11/1995 | Masterson | 345/155 |
| 5,481,669 | 1/1996 | Poulton et al. | 395/164 |
| 5,519,439 | 5/1996 | Keith | 345/155 |
| 5,673,065 | 9/1997 | DeLeeuw | 345/155 |

FOREIGN PATENT DOCUMENTS

WO 92/09947  6/1992  WIPO.

OTHER PUBLICATIONS

Fuchs et al., Fast Spheres, Shadows, Textures, Transparencies, and Image Enhancements in Pixel–Planes, *Association for Computing Machinery's SIGGRAPH '85*, pp. 111–120.

Williams, Lance, Pyramidal Parametrics, *Computer Graphics*, vol. 17, No. 3, pp. 1–11 (Jul. 1983).

*Primary Examiner*—Amare Mengistu
*Assistant Examiner*—Ricardo Osorio
*Attorney, Agent, or Firm*—Myers Bigel Sibley & Sajovec

[57] ABSTRACT

Methods, systems and computer program products are provided which utilize luminance in the reduction in resolution of high-resolution values of the color components to provide reduced-resolution values of the color components. These methods, systems and computer program products preferably reduce the resolution of the high-resolution-value of the color components for a picture element to provide reduced-resolution values based upon the difference in luminance between the high-resolution values of the color components and the reduced-resolution values of the color components. Preferably, the difference between the luminance of the high-resolution values of the color components and the reduced-resolution values of the color components is minimized.

23 Claims, 4 Drawing Sheets

Figure 4

LUMINANCE CONTROLLED COLOR RESOLUTION REDUCTION

Transmitted herewith for filing under 37 CFR 1.53(b) is: a Divisional of prior application Ser. No.: 08/790,150; filed Jan. 28, 1997, now U.S. Pat. No. 5,796,385.

FIELD OF THE INVENTION

The present invention relates to image generation and computer displays. More particularly, the present invention relates to the conversion of color values in images from a higher resolution color value to a lower resolution color value.

BACKGROUND OF THE INVENTION

In recent years, computer technology has generally become more accessible to a wider range of end users. This accessibility has, at least in part, been the result of the availability of what are generally thought of as more user-friendly graphical user interfaces. These interfaces take advantage of a computer system's high-resolution graphic display system to make operation of the computer system more intuitive to the user.

Along with the transition from text-based user interfaces to a graphical user interface there has also generally been an increase in the graphic applications utilized on modern computer systems. For example, current computer systems are often capable of multi-media displays such as full-motion video or computer generated animations which utilize high-resolution color displays to present information to a user.

An increase in the prevalence of more graphic-intense applications and interfaces has generally increased the requirements for a computer system to have the ability to provide for high-resolution color display of information. For example, many current personal computers are capable of displaying graphic information at both spatial and color resolutions only possible with dedicated graphics workstations in the past. Furthermore, increases in processing capabilities of central processing units and dedicated graphics processors has allowed for color determination at color resolutions in excess of what may be displayed by the display device. For example, a graphics processor may determine colors to a resolution of 24 bits or more while the display device may only be capable of displaying 16 bits of color resolution or less.

These changes in the uses and operation of computer systems have, to many users, increased the importance of the quality of the display capability of a computer system. The perceived quality of an image appearing on a computer video screen depends on the color resolution (the number of displayable colors and intensities) and spatial resolution (the number of picture elements or pixels in the display) of the video display hardware. Color resolution is measured by the number of color/intensity pairs that can be simultaneously displayed, or are "active" on screen. For example, an IBM-compatible personal computer with a VGA-based display system can simultaneously display 16 color/intensity combinations. A personal computer with a "super" VGA (SVGA)-based display system can simultaneously display 256 color/intensity combinations.

Color resolution is often quantified by the number of data bits for storing each pixel of the image in a computer's video memory (also known as the bit "depth" of the frame display buffer). Display systems with four bits per pixel can display only 16 simultaneous color/intensity combinations. As the number of bits per pixel grows from four to eight to twelve, etc., the size of the displayable color palette and the number of simultaneously displayable colors/intensities grows.

State-of-the-art display systems which go well beyond VGA and SVGA typically have 24 (or more) bits per pixel for displaying about 16.8 million color/intensities simultaneously. They also may provide a spatial resolution of 1280×1024 or higher. A 24 bit color system typically does not require color palettes which may use a look-up table to translate a bit value to a color based on the selected color palette because the values stored in the screen memory for each pixel directly indicate the values of the red, green and blue components to appear on the screen. The colors are said to be "direct mapped." Direct mapping generally allows any pixel to be any color which may be defined by the 24 bits of color resolution.

Typically, a 24 bit color resolution has eight bits in each color dimension of red, green, and blue. The specified bit values are called an RGB value (for red, green and blue), with each eight-bit value representing an intensity level of the respective color between 0 (zero intensity) and 1 (full intensity). Colors are specified by an ordered triple of values corresponding to the intensities of red, green and blue that are mixed to form the color. Red, for example has an RGB value of (1, 0, 0) while purple, which is half-intensity red and half-intensity blue, has an RGB value of (½, 0, ½).

As can be appreciated by those of skill in the art, the differences in display capabilities from computer system to computer system as well as differences between processing capabilities and display capabilities often may require that a high-resolution color value for a pixel be converted to a lower resolution color value. For example, an RGB color value calculated with more than 24 bits of color resolution may need to be converted to a 24 bit color value to enable display on the computer system. Similarly, a 24 bit or high color resolution value may need to be converted to the SVGA or VGA standard for display or the three bytes of a 24 bit value (8 bits red, 8 bits green, 8 bits blue) may be converted to a two byte representation (5 bits red, 5 bits green, 5 bits blue). To accomplish this decrease in color resolution a number of conventional systems have been developed. These systems are described in U.S. Pat. No. 5,455,600. These systems include, among others, truncating the color values, rounding the color values or "dithering" which may include either ordered or error diffusion and then truncation or rounding. Similarly, a system for reducing color error in a printer is described in U.S. Pat. No. 5,396,346. These systems generally attempt to reduce differences in color between the high-resolution color displayed and the lower resolution color displayed. While these systems may be suitable in certain applications, generally, each method may result in some visual artifact which may distract from the image displayed. Furthermore, certain of these methods may cause errors to be introduced into the image generated. For example, in conventional dithering used in the reduction of resolution, errors in the image are intentionally introduced in the form of noise which is introduced prior to the reduction in resolution to avoid banding artifacts.

Also, conventional methods of resolution reduction focus primarily on reducing artifacts while maintaining color accuracy between the higher and lower resolutions. However, human vision is more sensitive to changes in brightness of a picture element than to minor variations in color. The emphasis on color consistency between resolutions may result in changes in brightness or intensity in the generated image which may detract from the generated image. Accordingly, there exists a need for a method of reducing the color resolution of pixel values to be displayed without producing unwanted artifacts which detract from the image to be displayed.

SUMMARY OF THE INVENTION

In view of the above discussion, it is one object of the present invention to allow for the reduction in resolution of high-resolution color values without the generation of undesirable artifacts.

A further object of the present invention is to provide for the reduction in resolution of high-resolution color values without requiring a large number of operations to accomplish the reduction.

These and other objects of the present invention are provided by methods, systems and computer program products which utilize luminance in the reduction in resolution of high-resolution values of color components to provide reduced-resolution values of the color components. These methods, systems and computer program products preferably reduce the resolution of the high-resolution values of the color components for a picture element to provide reduced-resolution values of the color components based upon the difference in luminance between the high-resolution values of the color components and the reduced-resolution values of the color components. Preferably, the difference between the luminance of the high-resolution values of the color components and the reduced-resolution values of the color components is minimized.

In one embodiment of the present invention, the reduction in resolution based on luminance may be accomplished by weighting the differences between high-resolution values of color component values and corresponding reduced-resolution values of the high-resolution values of the color components based upon the contribution of the color component to the luminance of the picture element to produce luminance-weighted difference values. The luminance-weighted difference values may then be used to determine the combination of reduced-resolution values of the color components with the least difference in luminance from the luminance of the high-resolution values of the color components. In one particular embodiment the luminance-weighted difference values may be used to index into a look-up table to determine the combination of reduced-resolution values of the color components.

By utilizing changes in luminance between a picture element using the high-resolution values of the color components and a picture element using the reduced-resolution values, deviations in the display of a picture elements caused by the reduction in resolution may become less noticeable. As seen above, the present invention takes into account in reducing resolution the sensitivity of human vision to errors which are generated by the resolution reduction process. By taking into account the sensitivity of human vision, for example the fact that edges are more easily seen as differences in luminance than chrominance, the extent to which errors caused by reducing the resolution of color components are noticeable may be reduced. Thus, the present invention provides for reducing the deviation in luminance between the high-resolution values and the lower resolution values to thereby make any errors resulting from the resolution reduction less noticeable.

In a further embodiment of the present invention, the resolution of high-resolution-value color components is reduced to provide reduced-resolution values of the high-resolution values of the color components which result in a deviation in luminance of the picture element between the high-resolution values and the reduced-resolution values of less than the deviation resulting from separately rounding the high-resolution values to the reduced-resolution. In one embodiment of the present invention this reduction is accomplished by selecting the reduced-resolution values of the high-resolution values of the color components which result in a deviation in luminance of the picture element which is less than a predetermined value corresponding to the value of the deviation in luminance resulting from rounding the high-resolution values of the color components to the reduced-resolution.

In a further embodiment of the present invention, weighted surplus values corresponding to the surplus luminance resulting from each of the high-resolution values of the color components increased to a higher value to create reduced-resolution values of the color components are calculated. Weighted deficit values corresponding to the luminance deficit resulting from each of the high-resolution values of the color components decreased to a lower value to create reduced-resolution values of the color components are also calculated. Combinations of weighted surplus values and the weighted deficit values are evaluated to determine a combination of deficit and surplus values having a deviation in luminance of the picture element less than a predetermined value. The reduced-resolution values of the color components corresponding to the combination of deficit and surplus values which provide a deviation in luminance of the picture element less than the predetermined value are then selected for the reduction in resolution.

In particular embodiments, the combination of reduced-resolution values of the color components corresponding to the combination of deficit and surplus values which provide the least deviation in luminance of the picture element is selected for the resolution reduction.

In yet another embodiment of the present invention, the weighted surplus values are calculated by calculating weighted surplus values corresponding to the surplus luminance resulting from each of the high-resolution values of the color components increased to the next higher value at the reduced-resolution to create reduced-resolution values of the color components. Similarly, the weighted deficit values may be calculated by calculating weighted deficit values corresponding to the luminance deficit resulting from each of the high-resolution values of the color components decreased to the next lower value at the reduced-resolution to create reduced-resolution values of the color components.

In a particular embodiment of the present invention, the color components of the picture elements comprise red, green and blue color components. In such an embodiment, the weighting of the surplus and deficit values corresponding to the red color component may be about 0.28 times the red deficit or surplus value, the weighting of the surplus and deficit values corresponding to the green color component may be about 0.59 times the green deficit or surplus value, and the weighting of the surplus and deficit values corresponding to the blue color component may be about 0.13 times the blue surplus or deficit value.

In a still further embodiment of the present invention, the weighted surplus values corresponding to the surplus luminance are determined by increasing to a higher value at the reduced-resolution each high-resolution-value resolution value color component so as to provide an increased high-resolution-value color component for each color component. The difference between each high-resolution-value color component and its corresponding increased high-resolution-value color component is calculated to provide a surplus color component value for each color component. The surplus color component values are then weighted for each color component to provide the weighted surplus values. The weighted deficit values corresponding to the luminance deficit may be calculated by decreasing to a lower value at the reduced-resolution each high-resolution-value of the color components so as to provide a decreased high-resolution-value of the color components for each color component. The difference between each high-resolution-value color component and its corresponding decreased s high-resolution-value color component may then be calculated to provide a deficit color component value for each color component. The deficit color component values for each color component are then weighted to provide the weighted deficit values.

In another embodiment of the present invention, the reduction in resolution is achieved by providing a look-up table of combinations of reduced-resolution values of the color components which provide the least deviation in luminance from an original picture element. The difference values between the high-resolution values of the color components and the high-resolution values of the color components truncated to values at the reduced-resolution are used to provide color component look-up table indices. The color component look-up table indices are then utilized to look up the combination of color components which provides the least deviation in luminance from the picture element corresponding to the high-resolution values of the color components.

In such an embodiment, the color components of the picture elements may be red, green and blue color components. Then, the weighting of a red difference value may be ⅖ the red difference value, the weighting of a green difference value may be ⅝ the green difference value and the weighting of a blue difference value may be ⅛ the blue difference value.

In still another embodiment of the present invention, the resolution of high-resolution-value color components of a first number of bits in size is reduced to provide reduced-resolution-value color components of a second number of bits in size. Such a reduction may be accomplished by calculating fractional values corresponding to a color value deficit resulting from each of the high-resolution values of the color components decreased to a lower value to create fractional values of the color components. The fractional values of the color components are then weighted based upon the color components contribution to luminance to provide weighted fractional values. These weighted fractional values are then summed to provide a summed fractional value and the sum rounded to provide a rounded summed fractional value. The reduced-resolution values of the color components are then selected based upon the rounded summed fractional value.

In a particular embodiment the rounding of the summed fractional value may be accomplished by dividing the summed fractional value by $2^N$ where N is the difference between the first number of bits and the second number of bits to provide a scaled summed fractional value and then rounding the scaled summed fractional value to an integer value to provide the rounded summed fractional value. Furthermore, the reduced-resolution values of the color components may be selected based upon the most significant bits of the rounded summed fractional value.

In yet another embodiment of the present invention, the color components comprise red, green and blue color components and the weighting of the fractional values consists of multiplying the fractional value of the green color component by 5, and multiplying the fractional value of the red color component by 2. In an embodiment having red, green and blue color values the reduced-resolution value of the green color component may be selected based upon the value of the most significant bit of the rounded summed fractional value, the red color component may be selected based upon the value of the second most significant bit of the rounded summed fractional value and the blue color component may be selected based upon the value of the third most significant bit of the rounded summed fractional value. Finally, the increased reduced-resolution-value color component value may be selected if the corresponding bit of the rounded summed fractional value is a "1" and the decreased reduced-resolution-value color component value may be selected if the corresponding bit of the rounded summed fractional value is a "0".

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is described below with reference to flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 1:
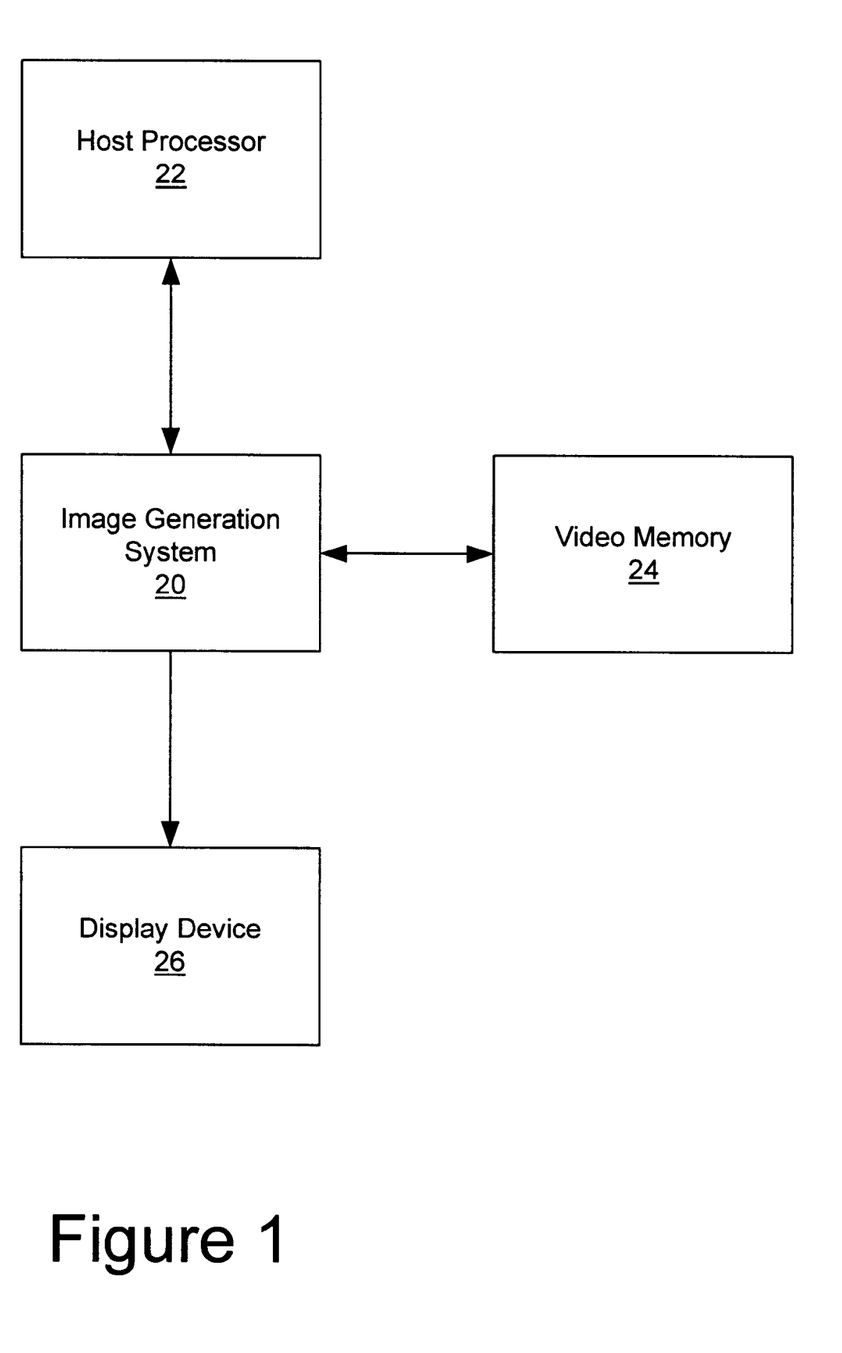
FIG. 1 is a block diagram of one embodiment of a system according to the present invention.

FIG. 1 illustrates one image generation system which may utilize the present invention. As seen in FIG. 1, an integrated image generation system 20 communicates with a host processor 22, video memory 24 and a display device 26. The integrated image generation system 20 receives information from the host processor 22 from which the image generation system 20 generates an image to be displayed on the display device 26.

In one aspect of the present invention, the image generation system 20 is provided with information about the image to be generated and displayed by a controlling process executing in the host processor 22 (by hardware or a combination of hardware and software). The image generation system 20 processes the information and provides an array of values corresponding to the pixels of the display device 26 such that the values define visible characteristics of each pixel to be displayed. Thus, the information to be displayed by the display device 26 may be viewed as a pixel array or array of pixels with pixel values for each element of the array which are determined by the image generation system 20 based on the information provided by the host processor 22. For example, these pixel values may be red, green and blue color values (RGB values) for each pixel. These values are then stored in video memory 24 for display on display device 26.

As will be appreciated by those of skill in the art, the image generation system 20 may generate pixel values at a higher bit resolution than are displayable on display device 26. For example, the image generation system 20 may generate a red value for a pixel at a bit resolution of 16 bits to divide the red intensity into 65,536 divisions, whereas the display device may only support 8 bit resolution of red or 256 divisions of the range of red intensities. Thus, before the values generated by the image generation system 20 may be displayed on display device 26 they should be reduced in resolution from 16 bits of resolution to 8 bits of resolution.

According to the present invention, the reduction in resolution of color values is accomplished to reduce the deviation in luminance or intensity between the high-resolution values and the reduced-resolution values. Preferably, the reduction in resolution is accomplished while minimizing any change in luminance between the high-resolution color values and the lower or reduced-resolution color values. In order to reduce resolution of color values while maintaining the luminance level of the picture element, the reduction in resolution takes into account the sensitivity of the human eye to the color which is being reduced.

Figure 2:
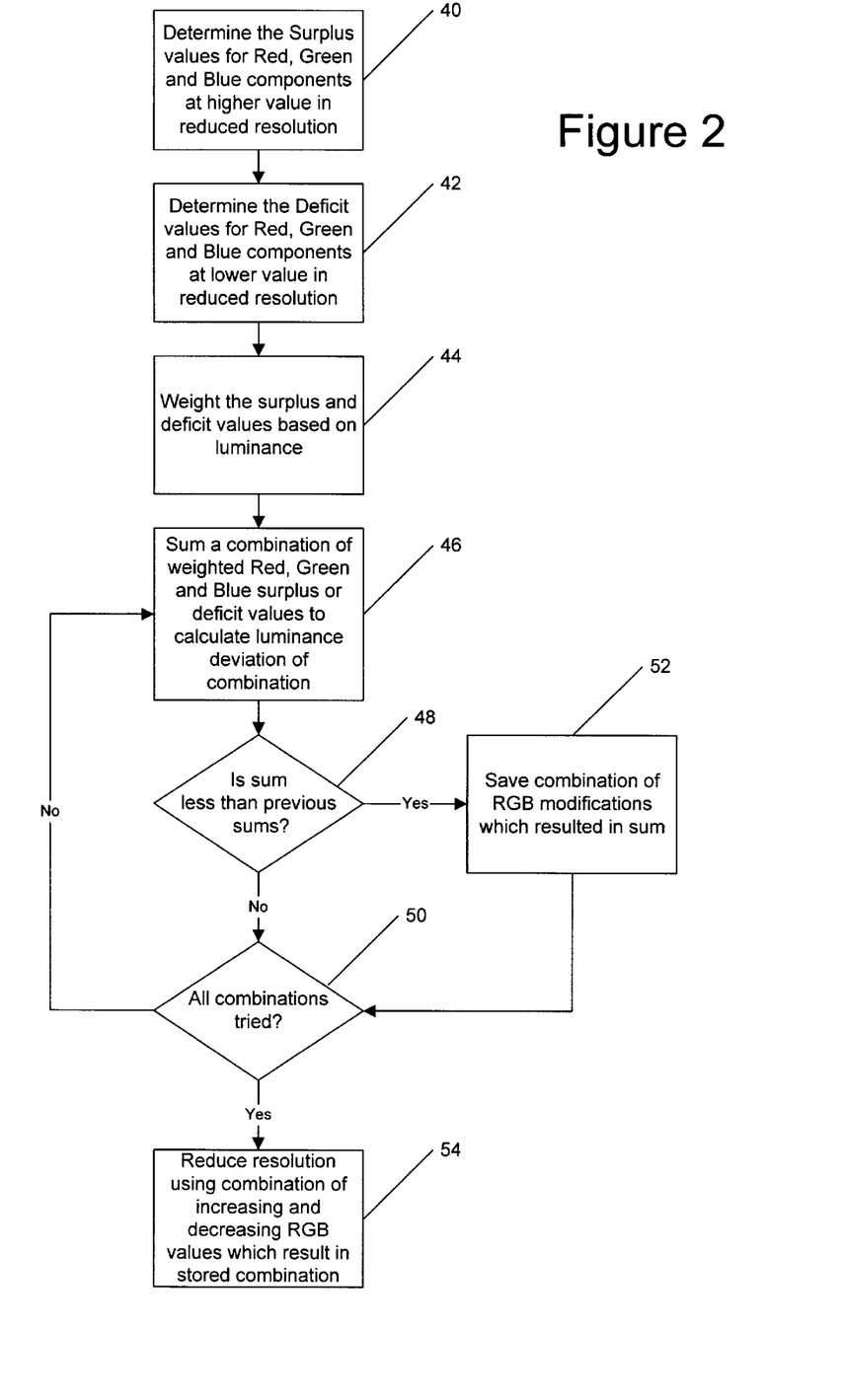
FIG. 2 is a flow chart illustrating the operation of one embodiment of the present invention.

FIG. 2 illustrates one method of reducing resolution utilizing the present invention which may be carried out by the image generation system 20 of FIG. 1. As seen in FIG. 2, for each color component, red, green and blue, a surplus value is calculated for the color value increased to a higher value at the reduced-resolution (block 40). Thus, for example, the surplus value may be calculated by increasing the color component value to a higher value defined at the reduced-resolution and then subtracting from that value the value of the color component at the higher resolution value. The result of this subtraction is the surplus value for that color component. In one embodiment of the present invention, the surplus values are calculated for the next higher value defined at the reduced-resolution. However, surplus values may be calculated for any number of higher values at the reduced-resolution and utilized in the resolution reduction process.

Similarly, as reflected in block 42, a deficit value is calculated for each color component value when the color value is decreased to a lower value at the reduced-resolution. The deficit value may be calculated, for example, by decreasing a color component value to a lower value at the reduced-resolution and then subtracting the lower value from the high-resolution value. The result of this subtraction is the deficit value for the color component. In one embodiment of the present invention, the deficit values are calculated for the next lower value defined in the reduced-resolution. However, deficit values may be calculated for any number of lower values at the reduced-resolution and utilized in the resolution reduction process.

While the present invention may utilize any number of higher and lower values at the reduced-resolution, from a practical standpoint image quality will limit the useable range. Thus, the constraint placed on the number and direction of possible reduced-resolution values is that eventually an unacceptable level of color deviation may result as the higher and lower values differ by greater and greater amounts from the nearest values to the high-resolution value. Thus, as long as the color deviation is acceptable, any number of higher and lower values may be used in determining the reduced-resolution color components.

As seen in block 44, after calculating the surplus and deficit values for each of the color components, these values are weighted. Preferably, these values are weighted based on the sensitivity of the human eye to the color associated with the surplus or deficit value. One such weighting method is to utilize the contribution of each color component to the luminance of the pixel described by the components. In such a case the weighting would be about 0.28R or $\frac{2}{8}$ R, about 0.59G or $\frac{5}{8}$ G, and about 0.13B or $\frac{1}{8}$ B, where R represents the red component, G represents the green component and B represents the blue component. This combination of weighting factors corresponds to the luminance of the pixel which may be calculated by the equation 0.28R+0.59G+0.13B.

After weighting the surplus and deficit values, each combination of weighted surplus and deficit values is combined to determine the level of perceptibility of the resolution reduction caused by the changes in the color components associated with the deficit and surplus values. In the embodiment reflected in FIG. 2 this change in level of perceptibility is reflected as a change in the luminance caused by the reduction in resolution. Thus, as seen at blocks 46, 48, 50 and 52, each combination of weighted surplus and deficit is summed to determine the combination with the lowest sum. This sum corresponds to the deviation in luminance which would be caused by the corresponding reduction in resolution. As seen in block 46 a sum of a combination of the weighted surplus and deficit values is calculated. This sum is then compared to the lowest sum previously calculated (block 48) and, if lower, the combination which resulted in the sum is saved (block 52). After all of the combinations have been calculated the last stored combination is the combination which results in the least deviation in luminance. As seen at block 54, the color components are then reduced in resolution using the combination of increasing and/or decreasing color components corresponding to the combination which resulted in the least deviation in luminance.

As seen in FIG. 2, the present invention utilizes the perceptibility of changes resulting from the reduction in resolution of color components as the basis for determining how color components should be reduced in resolution. Thus, for example, weighting the impact of possible changes in color components caused by a reduction in resolution based upon the colors contribution to luminance allows for the reduction in resolution to be optimized with respect to the final luminance of the picture element. As discussed above, because changes in luminance or intensity of a pixel may be more noticeable than changes in color of the pixel, the present invention provides for a reduction in resolution of the color components which may provide less perceptible changes in the final image and may make any artifacts resulting from the resolution reduction process less noticeable.

Table 1 and Table 2 below illustrate one example of the present invention in reducing the resolution of color components. As seen in the first row of Table 1, a group of high-resolution color values define a pixel. These high-resolution values of the color components include 12 bits of each color component. Accordingly, the range of levels of each color component is divided in 4096 units. The values in the first row of Table 1 indicate the number of each of these units present for the three color components.

TABLE 1

Calculation of Weighted Values

|  | Red | Green | Blue |
| --- | --- | --- | --- |
| High-resolution Value (12 bits = X/4096) | 487 | 229 | 854 |
| Increase Reduced-resolution Value (8 bits = X/256) | 31 | 15 | 54 |
| Decrease Reduced-resolution Value (8 bits = X/256) | 30 | 14 | 53 |
| Surplus Value | 0.5625 | 0.6875 | 0.6250 |
| Deficit Value | −0.4375 | −0.3125 | −0.3750 |
| Weighted Surplus Value | 0.1575 | 0.4056 | 0.0813 |
| Weighted Deficit Value | −0.1225 | −0.1844 | −0.0488 |

As seen in the second row and third row of Table 1, when decreased to the lower, reduced-resolution values, the high-resolution values of the color components define a value out of the possible 256 values which may be defined when 8 bits are provided for each color component. Thus, in the present example, when the red value of 487/4096 is reduced in resolution to 8 bits it may be reduced to 31/256 or 30/256. The conversions for green and blue are also shown in rows 2 and 3 of Table 1.

As seen in row 4 of Table 1, when the red value is translated to 31/256, which is an amount greater than 487/4096, there is some amount of surplus red which would result in the pixel. This amount is 0.5625/256 or 9/4096 which is the surplus value of the red color component. Similarly, as shown in row 5 of Table 1, when the red value is translated to 30/256, which is an amount less than 487/4096, there is some amount of red deficit which would result in the pixel. This amount is 0.4375/256 or 7/4096 which is the deficit value of the red color component. Similar surplus and deficit values result from the decrease in resolution of the green and blue color components. In the event that the higher resolution value of the color component directly translates to a reduced-resolution value of the color component then either a surplus of 0 and a deficit of 1 or a deficit of 0 and a surplus of 1 may result. Either case may be utilized.

Having established the surplus and deficit values for each color component, these values may then be weighted according to the color components contribution to luminance. The result of this weighting is reflected in row 7 of Table 1. These weighted surplus and deficit values are then summed in each possible combination to determine the combination which produces the least deviation in luminance. Because there are three color components and there are 2 possibilities for each there are 8 possible combinations of these color components. The results of the sum of the 8 possible combinations are shown in Table 2.

TABLE 2

Deviation in Luminance from Reduction in Resolution

| Combination | Red | Green | Blue | Sum |
| --- | --- | --- | --- | --- |
| (−, −, −) | −0.1225 | −0.1844 | −0.0488 | −0.3557 |
| (−, −, +) | −0.1225 | −0.1844 | 0.0813 | −0.23 |
| (−, +, −) | −0.1225 | 0.4056 | −0.0488 | 0.2343 |
| (−, +, +) | −0.1225 | 0.4056 | 0.0813 | 0.3644 |
| (+, −, −) | 0.1575 | −0.1844 | −0.0488 | −0.0757 |
| (+, −, +) | 0.1575 | −0.1844 | 0.0813 | 0.0544 |
| (+, +, −) | 0.1575 | 0.4056 | −0.0488 | 0.5143 |
| (+, +, +) | 0.1575 | 0.4056 | 0.0813 | 0.6444 |

In Table 2, the possible combinations are represented by an ordered set of three symbols representing the three color components red, green and blue, and where "+" indicates an increased lower resolution value and "−" indicates a decreased lower resolution value. Thus, as seen in Table 2, the combination of surplus and deficit values which result in the smallest sum are red "+", green "−" and blue "+". From these results the color component values may be reduced in resolution by using the increased red value, the decreased green value and the increased blue value which results in the selection of (31, 14, 54) for the RGB values. These values result in the least deviation in luminance from the high-resolution values.

As can be seen from the result of the above example, and as reflected in Table 2, the deviation in luminance of the selected combination of changes to the color components is less than would have resulted had the high-resolution values simply been rounded to the reduced-resolution. Had the three component values simply been rounded, then the increased values (−, −, −) would have been used in the reduction of resolution. However, as is seen in Table 2, a rounding of the high-resolution values would result in a deviation in luminance of −0.3557. By selectively choosing the changes in the combination of changes to the high-resolution values used in the reduction in resolution a deviation of 0.0544 for the (−, +, −) combination may be achieved. Thus, the present invention provides for a selection of reduced-resolution values based upon the resulting deviation in luminance which is preferably less than the deviation in luminance which would result from rounding if rounding does not achieve the least deviation in luminance.

While the above example illustrated the present invention with respect to an increase or a decrease of 1 unit at the low resolution, the present invention may also be utilized with other amounts of increase. For example, increases of both 1 and 2 units and decreases of both 1 and 2 units at the lower resolution may be employed with a corresponding increase in possible combinations. Furthermore, asymmetric increases and decreases could also be utilized.

Figure 3:
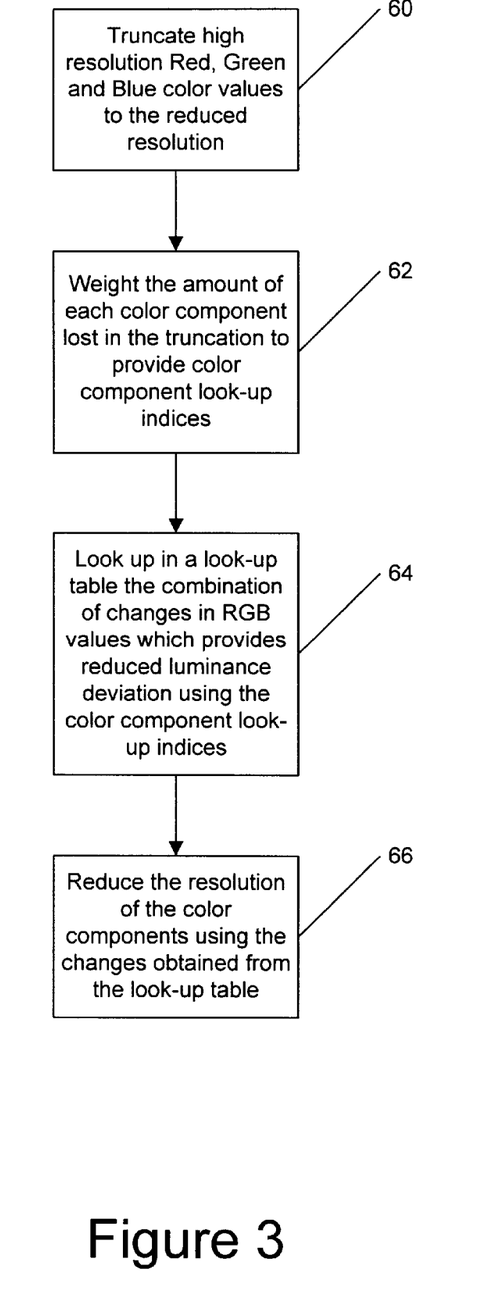
FIG. 3 is a flow chart illustrating the operation of another embodiment of the present invention.

An alternative embodiment of the present invention is illustrated in FIG. 3. As seen in FIG. 3, the color component values may be truncated to the lower resolution (block 60) and the amount of each color component lost by the truncation weighted based upon the sensitivity of the human eye to the color component (block 62). The weighted truncated bits may then be used as indices into a look-up table which provides the combination of lower resolution values which reduces the impact of the loss in color resolution by, for example, maintaining the luminance of the lower resolution color values (block 64). The combination of increased and/or decreased values at the reduced-resolution identified in the look-up table are then used to reduce the resolution of the high-resolution color values (block 66). The weighted truncation values may individually be used as indices into a multiple dimension array or, may be summed and used as indices into a linear array. Alternatively, a combination of determining surplus and deficit values and using these values as indices into a look-up table may also be suitable for use with the present invention.

In the look-up table example, the extra bits between the high-resolution-value color values and the reduced-resolution-value color values are weighted based on their luminance contribution and then summed and used as an index into a look-up table. Thus, an index value "E" may be calculated as E=0.28(R extra bits)+0.59(G extra bits)+0.13(B extra bits). In this calculation the extra bits of the color components may be interpreted as a fraction between 0 and 1. In such a case the E index could then be used with the following look-up table to determine how the color values should be reduced in resolution:

TABLE 3

Look-up Table

| E Value | R | G | B |
|---|---|---|---|
| 0 to 0.065 | − | − | − |
| 0.066 to 0.205 | − | − | + |
| 0.206 to 0.345 | + | − | − |
| C.346 to 0.500 | + | − | + |
| 0.501 to 0.655 | − | + | − |
| 0.656 to 0.795 | − | + | + |
| 0.796 to 0.936 | + | + | − |
| 0.936 to 0.999 | + | + | + |

The calculated E value is used as the index into the look-up table and the color components are either increased or decreased at the reduced-resolution-value based upon the value of E and the values in the look-up table. As with the previous examples, the "+" and "−" symbols indicate whether the reduced-resolution-value component should be increased (+) or decreased (−).

Figure 4:
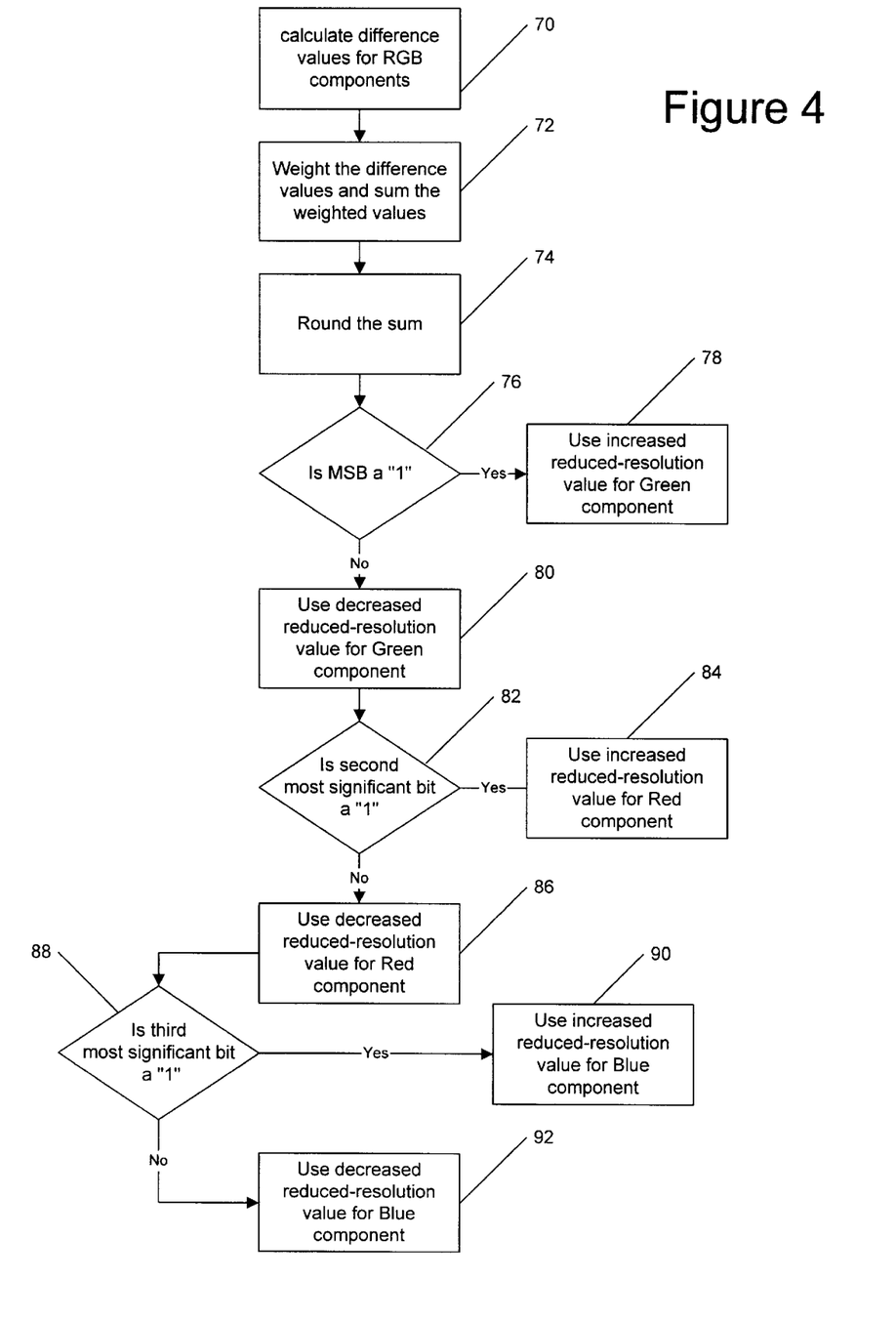
FIG. 4 is a flow chart illustrating the operation of a third embodiment of the present invention.

In another alternative embodiment of the present invention illustrated in FIG. 4, the RGB fractions are computed as the high-resolution-value minus the decreased reduced-resolution-value (block 70). This subtraction results in values for each color component of up to N bits in size where N is equal to the difference in the number of bits in the high-resolution-value and the number of bits in the reduced-resolution-value. These color component difference values are then weighted such that the red difference value is multiplied by 2 and the green difference value is multiplied by 5 (block 72). The weighted difference values are then summed (block 72). This summed value may be up to N+3 bits in size. The sum may be expressed as the following equation:

SUM = (high-resolution green value) − (decreased reduced-resolution green value) *5 + (high-resolution red value) − (decreased reduced-resolution red value) *2 + (high-resolution blue value) − (decreased reduced-resolution blue value)

To determine which combination of increased or decreased color components results in the least deviation in luminance, the summed value is rounded to the three most significant bits (block 74) and then evaluated to determine if a color component should be increased or decreased by evaluating the values of bits in the sum. Defining the least significant bit as bit 0, the sum is rounded such that bits 0 through N−1 are removed from the value. Then, if bit N+2 is a "1" then the green component is increased, if bit N+2 is a "0" then the decreased value is used (block 76, block 78 and block 80). Similarly, if bit N+1 is a "1" then the red component is increased and if bit N+1 is a "0" then the decreased red component value is used (block 82, block 84 and block 86). Finally, if bit N is a "1" then the increased blue component value is used and if bit N is a "0" then the decreased value is used (block 88, block 90 and block 92).

In the example described above, the sum evaluates to the following:

SUM=(229−224)*5+(487−480)*2+(854−848)

SUM=25+14+6=45

In the present example where a 12 bit value is reduced to an 8 bit value N=4. Thus, bits 4, 5 and 6 are evaluated in the sum to determine how the color components should be reduced in resolution. The value 45 expressed in binary for with the most significant bit as the first bit is 0101101. Rounding bits 0 through N−1 results in the a value of 011XXXX. Then, evaluating bit N+2 says that the green component should be decreased (−) and evaluating bits N+1 and N says that the red and blue components should be increased. Thus, for the (+−+) RGB combination results from the evaluation of the three most significant bits of the rounded sum.

While the summation method described above provided the same results as are provided by the more rigorous evaluation of each combination of surplus and deficit values, the summation method may, in certain instances be less accurate than the more rigorous method. However, while the deviation in luminance may not be minimized in all cases by use of the summation method, the summation method may still provide results which provide less deviation in luminance between the high-resolution value and the reduced-resolution value than would be provided by rounding the color component values.

The present invention has been described with respect to an RGB system. However, as will be appreciated by those of skill in the art, other systems may be utilized for defining pixel colors and the present invention may be equally applicable to those systems. Furthermore, while the present invention has been described with respect to the system of FIG. 1, the present invention may be utilized in any system which may require resolution in color values. For example, the present invention may be utilized in systems such as those described in commonly assigned U.S. patent application Ser. No. 08/661,902, entitled WAVELET COMPRESSION, U.S. patent application Ser. No. 08/661,200, entitled IMAGE GENERATION SYSTEM, U.S. patent application Ser. No. 08/661,194, entitled TEXTURING OF COMPUTER GRAPHIC IMAGES, U.S. patent application Ser. No. 08/661,031, entitled GEOMETRY PROCESSING OF DIGITAL VIDEO MODELS AND IMAGES, U.S. patent application Ser. No. 08/661,069, entitled LINEAR EXPRESSION EVALUATOR, or U.S. patent application Ser. No. 08/661,028, entitled LOAD BALANCED IMAGE GENERATION the disclosures of which are incorporated herein by reference as if set forth fully. Accordingly, the present invention should not be construed as limited to the particular embodiment described in FIG. 1.

In the drawings and specification, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A method of reducing the resolution of high-resolution values of color components of a picture element comprising the steps of:

reducing the resolution of the high-resolution values of the color components to provide reduced-resolution values of the high-resolution values of the color components based upon the difference in luminance between the high-resolution values of the color components and the reduced-resolution values of the color components wherein said reducing step includes the steps of:

weighting the differences between high-resolution values of color component values and corresponding reduced-resolution values of the high-resolution values of the color components based upon the contribution of a color component to the luminance of the picture element to produce luminance-weighted difference values; and determining from the luminance-weighted difference values the combination of reduced-resolution values of the color components with the least difference in luminance from the luminance of the high-resolution values of the color components by indexing into a look-up table based upon the luminance-weighted difference values to determine the combination of reduced-resolution values of the color components.

2. A method of reducing resolution of high-resolution values of color components of a picture element, the method comprising the steps of:

increasing to a higher value at a reduced-resolution each high-resolution-value color component so as to provide an increased high-resolution-value color component for each color component;

calculating the difference between each high-resolution-value color component and its corresponding increased high-resolution-value color component to provide a surplus color component value for each color component;

weighting the surplus color component values for each color component to provide the weighted surplus values;

decreasing to a lower value at the reduced-resolution each high-resolution-value color component so as to provide a decreased high-resolution-value color component for each color component;

calculating the difference between each high-resolution-value color component and its corresponding decreased high-resolution-value color component to provide a deficit color component value for each color component; and weighting the deficit color component values for each color component to provide the weighted deficit values;

evaluating the combinations of weighted surplus values and the weighted deficit values to determine a combination of deficit and surplus values having a deviation in luminance of the picture element of less than a predetermined value; and selecting the reduced-resolution values of the color components corresponding to the combination of deficit and surplus values which provide a deviation in luminance of the picture element less than a predetermined value.

3. A method of reducing resolution of high-resolution values of color components according to claim 2, wherein the color components of the picture elements comprise red, green and blue color components.

4. A method of reducing resolution of high-resolution values of color components according to claim 3, wherein the weighted deficit value and weighted surplus value for the red color component are about 0.28 times the corresponding deficit value or surplus value corresponding to the red color component, the weighted deficit value and weighted surplus value for the green color component are about 0.59 times the corresponding deficit value or surplus value corresponding to the green color component and the weighted deficit value and weighted surplus value for the blue color component are about 0.13 times the corresponding deficit value or surplus value corresponding to the blue color component.

5. A method of reducing resolution of high-resolution values of color components comprising the steps of:

providing a look-up table of combinations of reduced-resolution values of the color components which provide the least deviation in luminance from an original picture element;

weighting the difference values between the high-resolution-value color components and the high-resolution values of the color components truncated to the reduced-resolution to provide color component look-up table indices; and utilizing the color component look-up table indices to look up the combination of reduced-resolution values of the color components which provides the least deviation in luminance from the picture element corresponding to the high-resolution values of the color components.

6. A method of reducing resolution of high-resolution values of color components according to claim 5, wherein the color components of the picture elements comprise red, green and blue color components.

7. A method of reducing resolution of high-resolution values of color components according to claim 6, wherein the weighting of a red difference value is 2/8 the red difference value, the weighting of a green difference value is 5/8 the green difference value and the weighting of a blue difference value is 1/8 the blue difference value.

8. A system for reducing the resolution of high-resolution values of color components of a picture element comprising:

means for evaluating the difference in luminance between the high-resolution values of the color components and reduced-resolution values of the color components wherein said means for evaluating includes:

means for weighting the differences between high-resolution values of color component values and corresponding reduced-resolution values of the high-resolution values of the color components based upon the contribution of a color component to the luminance of the picture element to produce luminance-weighted difference values; and means for determining from the luminance-weighted difference values the combination of reduced-resolution values of the color components with the least difference in luminance from the luminance of the high-resolution values of the color components by indexing into a look-up table based upon the luminance-weighted difference values to determine the combination of reduced-resolution values of the color components;

means for reducing the resolution of the high-resolution values of the color components to provide reduced-resolution values of the high-resolution values of the color components based upon the difference in luminance between the high-resolution values of the color components and the reduced-resolution values of the color components.

9. A system for reducing resolution of high-resolution values of color components of a picture element comprising:

means for increasing to a higher value at a reduced-resolution each high-resolution-value color component so as to provide an increased high-resolution-value color component for each color component;

means for calculating the difference between each high-resolution-value color component and its corresponding increased high-resolution-value color component to provide a surplus color component value for each color component;

means for weighting the surplus color component values for each color component to provide the weighted surplus values;

means for decreasing to a lower value at the reduced-resolution each high-resolution-value color component so as to provide a decreased high-resolution-value color component for each color component;

means for calculating the difference between each high-resolution-value color component and its corresponding decreased high-resolution-value color component to provide a deficit color component value for each color component; and means for weighting the deficit color component values for each color component to provide the weighted deficit values;

means for evaluating the combinations of weighted surplus values and the weighted deficit values to determine a combination of deficit and surplus values having a deviation in luminance of the picture element of less than a predetermined value; and means for selecting the reduced-resolution values of the color components corresponding to the combination of deficit and surplus values which provide a deviation in luminance of the picture element less than a predetermined value.

10. A system for reducing resolution of high-resolution values of color components according to claim 9, wherein said means for reducing includes means for selecting the reduced-resolution values of the high-resolution values of the color components which result in a deviation in luminance of the picture element which is less than a predetermined value corresponding to the value of the deviation in luminance resulting from rounding the high-resolution values of the color components to the reduced-resolution.

11. A system for reducing resolution of high-resolution values of color components according to claim 9, wherein the color components of the picture elements comprise red, green and blue color components.

12. A system for reducing resolution of high-resolution values of color components according to claim 11, wherein the weighted deficit value and weighted surplus value for the red color component are about 0.28 times the corresponding deficit value or surplus value corresponding to the red color component, the weighted deficit value and weighted surplus value for the green color component are about 0.59 times the corresponding deficit value or surplus value corresponding to the green color component and the weighted deficit value and weighted surplus value for the blue color component are about 0.13 times the corresponding deficit value or surplus value corresponding to the blue color component.

13. A system for reducing resolution of high-resolution values of color components comprising:

a look-up table of combinations of reduced-resolution values of the color components which provide the least deviation in luminance from an original picture element;

means for weighting the difference values between the high-resolution-value color components and the high-resolution values of the color components truncated to the reduced-resolution to provide color component look-up table indices; and wherein said means for reducing includes:

means for utilizing the color component look-up table indices to look up the combination of reduced-resolution values of the color components which provides the least deviation in luminance from the picture element corresponding to the high-resolution values of the color components.

14. A system for reducing resolution of high-resolution values of color components according to claim 13, wherein the color components of the picture elements comprise red, green and blue color components.

15. A system for reducing resolution of high-resolution values of color components according to claim 14, wherein the weighting of a red difference value is 2/8 the red difference value, the weighting of a green difference value is 5/8 the green difference value and the weighting of a blue difference value is 1/8 the blue difference value.

16. A computer program product for reducing the resolution of high-resolution values of color components of a picture element, the computer program product comprising:

a computer-readable storage medium having computer-readable program code means embodied in said medium, said computer-readable program code means comprising:

computer-readable program code means for evaluating the difference in luminance between the high-resolution values of the color components and reduced-resolution values of the color components wherein said computer-readable program code means for evaluating includes:

computer-readable program code means for weighting the differences between high-resolution values of color component values and corresponding reduced-resolution values of the high-resolution values of the color components based upon the contribution of a color component to the luminance of the picture element to produce luminance-weighted difference values; and computer-readable program code means for determining from the luminance-weighted difference values the combination of reduced-resolution values of the color components with the least difference in luminance from the luminance of the high-resolution values of the color components by indexing into a look-up table based upon the luminance-weighted difference values to determine the combination of reduced-resolution values of the color components;

computer-readable program code means for reducing the resolution of the high-resolution values of the color components to provide reduced-resolution values of the high-resolution values of the color components based upon the difference in luminance between the high-resolution values of the color components and the reduced-resolution values of the color components.

17. A computer program product for reducing resolution of high-resolution values of color components of a picture element, the computer program product comprising:

a computer-readable storage medium having computer-readable program code means embodied in said medium, said computer-readable program code means comprising:

computer-readable program code means for increasing to a higher value at a reduced-resolution each high-resolution-value color component so as to provide an increased high-resolution-value color component for each color component;

computer-readable program code means for calculating the difference between each high-resolution-value color component and its corresponding increased high-resolution-value color component to provide a surplus color component value for each color component;

computer-readable program code means for weighting the surplus color component values for each color component to provide the weighted surplus values;

computer-readable program code means for decreasing to a lower value at the reduced-resolution each high-resolution-value color component so as to provide a decreased high-resolution-value color component for each color component;

computer-readable program code means for calculating the difference between each high-resolution-value color component and its corresponding decreased high-resolution-value color component to provide a deficit color component value for each color component; and computer-readable program code means for weighting the deficit color component values for each color component to provide the weighted deficit values;

computer-readable program code means for evaluating the combinations of weighted surplus values and the weighted deficit values to determine a combination of deficit and surplus values having a deviation in luminance of the picture element of less than a predetermined value; and computer-readable program code means for selecting the reduced-resolution values of the color components corresponding to the combination of deficit and surplus values which provide a deviation in luminance of the picture element less than a predetermined value.

18. A computer program product for reducing resolution of high-resolution values of color components according to claim 17, wherein said computer-readable program code means for reducing includes computer-readable program code means for selecting the reduced-resolution values of the high-resolution values of the color components which result in a deviation in luminance of the picture element which is less than a predetermined value corresponding to the value of the deviation in luminance resulting from rounding the high-resolution values of the color components to the reduced-resolution.

19. A computer program product for reducing resolution of high-resolution values of color components according to claim 17, wherein the color components of the picture elements comprise red, green and blue color components.

20. A computer program product for reducing resolution of high-resolution values of color components according to claim 19, wherein the weighted deficit value and weighted surplus value for the red color component are about 0.28 times the corresponding deficit value or surplus value corresponding to the red color component, the weighted deficit value and weighted surplus value for the green color component are about 0.59 times the corresponding deficit value or surplus value corresponding to the green color component and the weighted deficit value and weighted surplus value for the blue color component are about 0.13 times the corresponding deficit value or surplus value corresponding to the blue color component.

21. A computer program product for reducing resolution of high-resolution values of color components comprising:

a computer-readable storage medium having computer-readable program code means embodied in said medium, said computer-readable program code means comprising:

computer-readable program code means for providing a look-up table of combinations of reduced-resolution values of the color components which provide the least deviation in luminance from an original picture element;

computer-readable program code means for weighting the difference values between the high-resolution-value color components and the high-resolution values of the color components truncated to the reduced-resolution to provide color component look-up table indices; and wherein said computer-readable program code means for reducing includes:

computer-readable program code means for utilizing the color component look-up table indices to look up the combination of reduced-resolution values of the color components which provides the least deviation in luminance from the picture element corresponding to the high-resolution values of the color components.

22. A computer program product for reducing resolution of high-resolution values of color components according to claim 21, wherein the color components of the picture elements comprise red, green and blue color components.

23. A computer program product for reducing resolution of high-resolution values of color components according to claim 22, wherein the weighting of a red difference value is $2/8$ the red difference value, the weighting of a green difference value is $5/8$ the green difference value and the weighting of a blue difference value is $1/8$ the blue difference value.

* * * * *